Nov. 19, 1963   R. S. WAITE   3,110,972
SCRAPER WITH HYDRAULICALLY CONTROLLED COMPONENTS
Filed Oct. 30, 1961   5 Sheets-Sheet 1

Richard S. Waite
INVENTOR.

BY *Clarence A. O'Brien*
*and Harvey B. Jacobson*
Attorneys

Nov. 19, 1963   R. S. WAITE   3,110,972
SCRAPER WITH HYDRAULICALLY CONTROLLED COMPONENTS
Filed Oct. 30, 1961   5 Sheets-Sheet 2

Richard S. Waite
INVENTOR.

Nov. 19, 1963    R. S. WAITE    3,110,972
SCRAPER WITH HYDRAULICALLY CONTROLLED COMPONENTS
Filed Oct. 30, 1961    5 Sheets-Sheet 3

Richard S. Waite
INVENTOR.

Nov. 19, 1963 R. S. WAITE 3,110,972
SCRAPER WITH HYDRAULICALLY CONTROLLED COMPONENTS
Filed Oct. 30, 1961 5 Sheets-Sheet 4
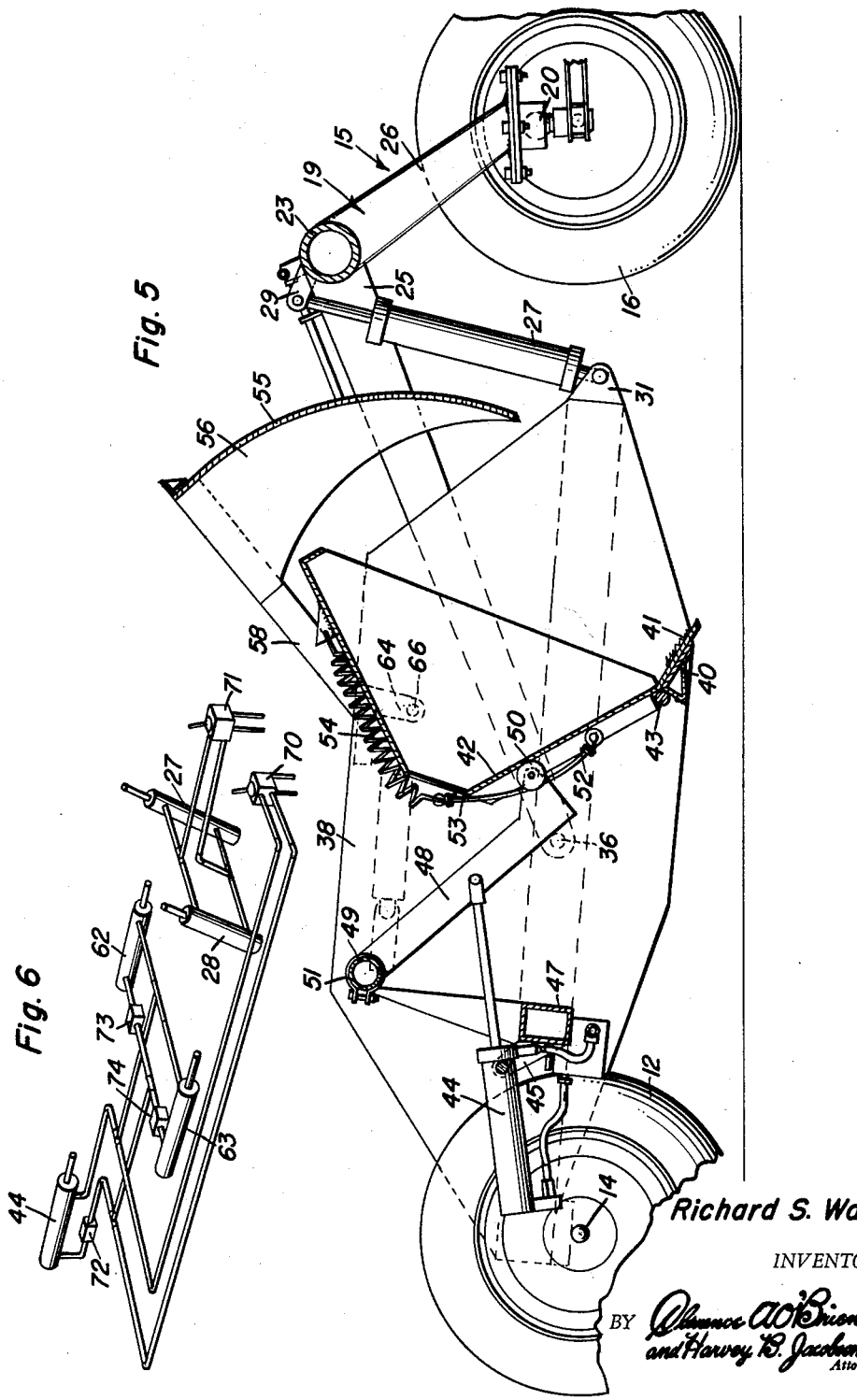
Richard S. Waite
INVENTOR.

Nov. 19, 1963 R. S. WAITE 3,110,972
SCRAPER WITH HYDRAULICALLY CONTROLLED COMPONENTS
Filed Oct. 30, 1961 5 Sheets-Sheet 5
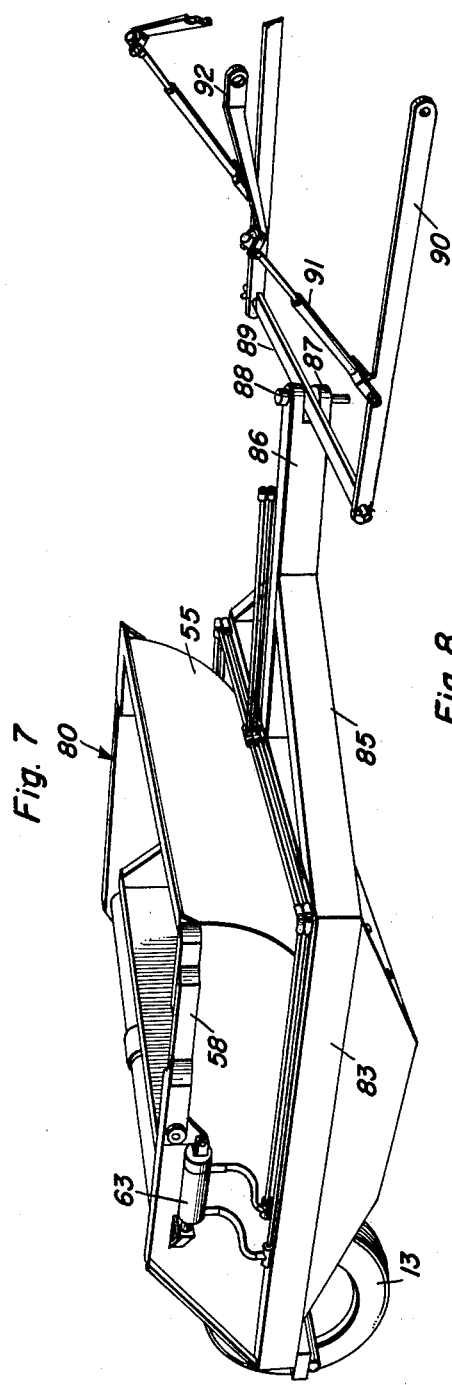
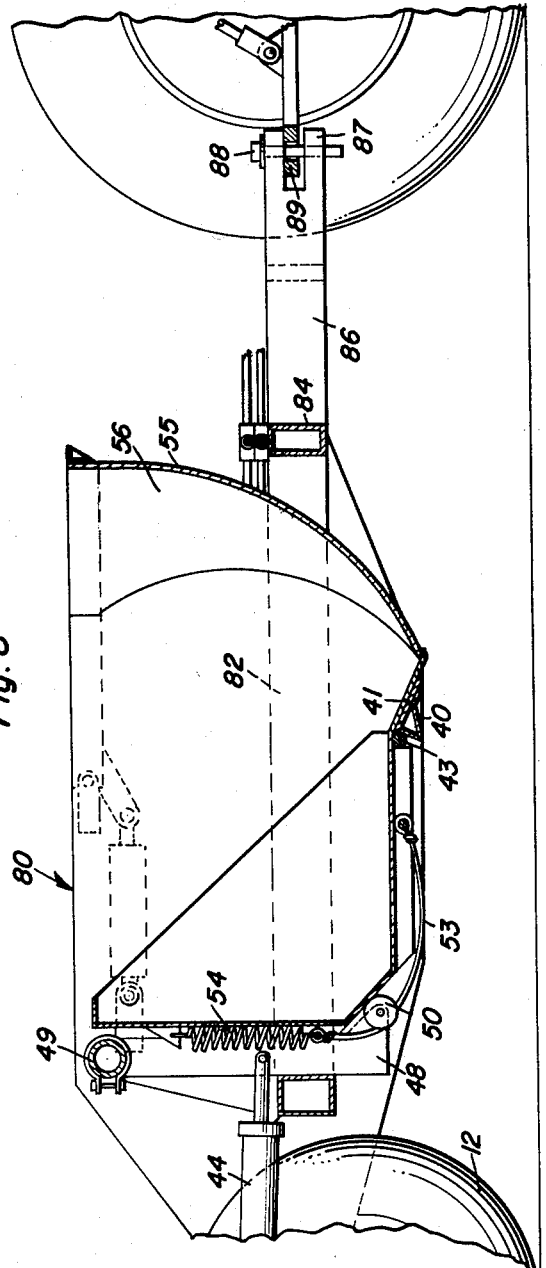
Richard S. Waite
INVENTOR.

United States Patent Office 3,110,972
Patented Nov. 19, 1963

3,110,972
SCRAPER WITH HYDRAULICALLY CONTROLLED COMPONENTS
Richard S. Waite, Columbus, Nebr., assignor to The Soil Mover Co., Inc., Columbus, Nebr., a corporation of Nebraska
Filed Oct. 30, 1961, Ser. No. 148,601
4 Claims. (Cl. 37—126)

The present invention generally relates to a scraper construction and more particularly to a scraper adapted to be attached to a tractor or other towing vehicle having a source of pressurized hydraulic fluid thereon, the scraper being capable of scraping, loading, transporting, dumping or spreading, smoothing, grading, and levelling dirt or similar material.

The primary object of the present invention is to provide a scraper in which the various components thereof are hydraulically controlled from the towing tractor or other vehicle, thus providing a simple and positive control for the components without the use of any complicated or troublesome mechanical links, cable and pulley mechanisms such as are commonly employed on scrapers of this nature.

Another object of the present invention is to provide a scraper with hydraulic piston and cylinder assemblies arranged in such a manner that the depth of spread or fill can be accurately controlled by a hydraulic control lever rather than by the speed of travel and the ejection speed as is the normal manner of controlling the depth of spread or fill.

A further object of the present invention is to provide a scraper having hydraulically controlled components including an ejector bucket which may be tilted forward so that the machine will act as an efficient grader or leveller.

A very important object of the present invention is to provide a scraper having hydraulically controlled components and a hydraulic circuit including a valve orientated in such a manner that a gate used to retain the dirt or other material during transport can be hydraulically raised or lowered or held in any position between maximum raised and maximum lowered positions as desired. The ejector bucket can be actuated to eject the dirt or other material, return to loading position or held in any position between loading position and maximum dump position as desired by employing a single hydraulic valve control lever on the tractor or other towing vericle.

Still another very important object of the present invention is to provide a scraper with hydraulically controlled components which is relatively simple in construction, efficient in operation, rugged and long-lasting, easily and positively controlled, and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a sectional view similar to FIGURE 4 but illustrating the components of the scraper in a different position;

FIGURE 6 is a schematic view illustrating the hydraulic circuit employed in the present invention;

FIGURE 7 is a perspective view of a modified scraper for attachment to tractors having elevatable drawbars; and FIGURE 8 is a longitudinal sectional view of the construction of FIGURE 7.

Figure 1:
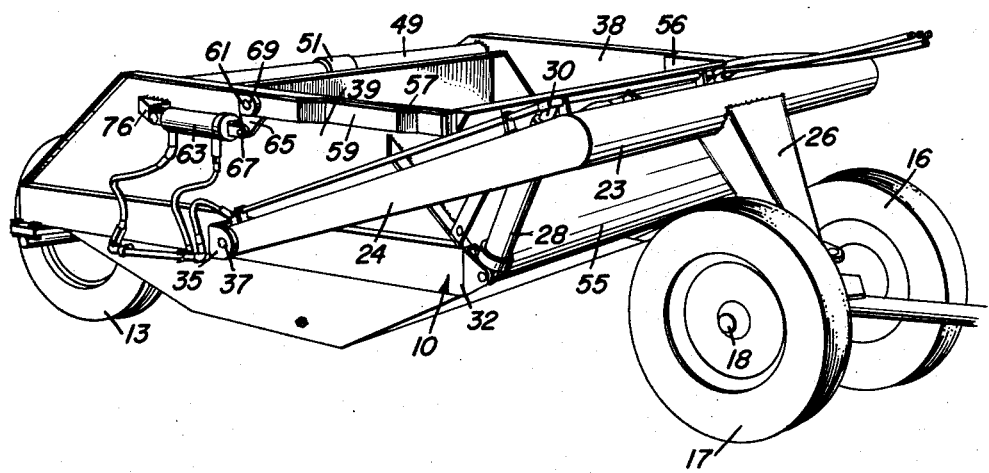
FIGURE 1 is a perspective view of the scraper of the present invention taken from the front thereof.

Referring now to the accompanying drawings, the scraper of the present invention has a main frame 10 supported by ground-engaging members such as wheels 12 and 13 on axles 14 that are carried at the rear end of frame 10. The front part of the frame 10 is connected to a dolly 15 consisting of wheels 16 and 17 on an axle 18 that is connected with yoke 19 by a ball and socket 20. A tongue 21 that is adapted to connect to a traction device such as a tractor or other towing vehicle is braced and secured to axle 18. The yoke 19 has a cross-member 23 together with parallel sides 24 and 25 fixed at the ends of the cross-member. A post 26 is secured to the cross-member 23 intermediate its ends and is operatively connected with the ball and socket 20. Lift piston and cylinder assemblies 27 and 28 are pivoted to cylinder hangers 29 and 30 that are fixed to cross-member 23 and that are located between the sides 25 and 24 of yoke 19. The piston and cylinder assemblies 27 and 28 are pivoted to the front ends of the side main frame members 31 and 32 to which the body or bucket 33 of the scraper is attached. Brackets 34 and 35 are secured to the main frame members 31 and 32 and pivots 36 and 37 are in these brackets 34 and 35 and also in apertures in the ends of the yoke sides 24 and 25 thereby pivotally connecting the main frame 10 to the sides of the yoke at a location intermediate the front and rear ends of the main frame.

The body or bucket 33 of the machine has a pair of sides 38 and 39 together with a reinforced cutter blade support 40 attached to the lower parts of the sides. The top and front of the bucket 33 are open and there is a cutter blade 41 attached to the front of the cutter blade support 40 at an inclination to the bottom. The rear and bottom of the bucket 33 are open and occupied by an ejector bucket 42 pivotally connected by a hinge 43 to the back side of cutter blade support 40. The rear and lower edges of ejector bucket 42 are very close to the sides 38 and 39 of the bucket 33.

Ejector piston and cylinder assembly 44 is pivoted to trunnion supports 45 and 46 fixed to a cross-member 47. The forward end of the ejector piston and cylinder assembly 44 is pivotally connected to an ejector bar 48 which is pivotally connected to cross-member 49. An ejector bar roller 50 is fastened to the lower end of the ejector bar 48 so that when the ejector piston and cylinder assembly 44 is operated, the ejector bar 48 swings about a journal 51 causing the ejector bar roller 50 to push upwardly and forwardly against the track 52 secured to the rear and bottom of the ejector bucket 42. This causes the ejector bucket 42 to pivot about hinge 43 from a load position to a full dump position.

A cable 53 is attached to the bottom of the ejector bucket 42 and passes around ejector bar roller 50 and is connected to a spring 54 which in turn is fastened to the rear of the ejector bucket 42, thus keeping the ejector bar roller 50 in contact with the track 52 when the ejector bucket 42 is returned to a load position.

The open front of the bucket 33 is occupied by a gate 55 having sides 56 and 57 and arms 58 and 59 which are pivotally connected to brackets 60 and 61. Gate-operating piston and cylinder assemblies 62 and 63 are connected to cylinder brackets 75 and 76 which are secured to the bucket sides 38 and 39. The forward ends of the piston and cylinder assemblies are connected to lever arms 64 and 65 at pivot points 66 and 67 so that when the gate piston and cylinder assemblies are operated, they push on lever arms 64 and 65 thus causing the gate 55 to open by swinging about pivots 68 and 69.

As illustrated in FIGURE 6, the hydraulic circuit has suitable valves 70 and 71, ordinary pipe lines and a conventional pump and tank (not shown). One feature of the hydraulic system is that the gate piston and cylinder assemblies 62 and 63 and the ejector piston and cylinder assembly 44 are connected to a valve 72 in such a manner that the gate piston and cylinder assemblies and the ejector piston and cylinder assembly can be operated by a single valve. The valve 72 is set so that the port leading to the rear of the ejector cylinder remains closed until the gate cylinders have reached the extent of their travel. Thus, when the valve 70 is operated, the gate will open for admission of dirt and the ejector bucket will remain in loading position. The gate can be raised to any height (up to its maximum opening) for the admission of dirt and held in that position. When the scraper is loaded, the valve 70 is reversed and the cylinders force the gate shut. To dump the load, the same valve 70 is operated and the gate raises to its maximum opening. At that point, the pressure opens up the port to the ejector cylinder and unloads the scraper. Restrictors 73 and 74 are utilized in the gate cylinder lines to slow down the return movement of the gate when the valve 70 is reversed and the ejection cylinder returns the ejector bucket to loading position and the gate cylinders return the gate. It is pointed out that the valves 70 and 71 can be conveniently located on the traction vehicle such as a tractor or the like.

In the operation of the scraper, the tongue 21 is secured to the hitch of a tractor and the pipes or tubing leading to the hydraulic piston and cylinder assemblies are connected to the hydraulic control and actuating mechanism mounted on the tractor.

As the scraper moves forwardly over the ground, the gate 55 is raised to the desired height by means of a control lever which actuates the gate cylinders and the ejection cylinder. The hydraulic valve diverts the flow of fluid to the rear of the gate cylinders 62 and 63. The blade 41 and bucket 33 are then lowered to the desired depth of cut by means of the control lever which actuates the lift cylinders 27 and 28 and the dirt moves over the blade and fills the scraper. The blade and bucket are then raised to transport position by reversing the flow of fluid to the lift cylinders and the gate is closed by reversing the flow of fluid to the gate cylinders.

To spread the load of dirt, the blade 41 is set to the required distance above the ground to give the desired depth or fill or spread and the hydraulic control lever connected to the ejector cylinder and gate cylinders is actuated to discharge the dirt. The fluid flows to the hydraulic valve where it is diverted to the gate cylinders 62 and 63, thus opening the gate and allowing the dirt contained in the front part of the bucket 33 to pass beneath the blade. When the gate cylinders have reached their maximum stroke, the fluid pressure builds up in the hydraulic lines and the hydraulic valve then diverts the fluid to the ejector cylinder 44 and the ejector cylinder causes the ejector bar roller 50 to push the rear of the ejector bucket 42 up and forward since the front of the bucket 42 is hinged and the remaining dirt in the bucket 33 is forced out and passes beneath the blade.

The ejector bucket 42 is then returned to loading position by reversing the hydraulic control lever connected to the ejection cylinder and gate cylinders. One or more restrictors, one on each side of this particular machine, together with a hydraulic valve, hold the gate up until the ejector bucket is in the loading position. Then the flow of fluid is diverted to the gate cylinders and lowers the gate.

To grade or level, the gate 55 is opened and the ejector bucket 42 is moved or pivoted to approximately full dump position and the blade 41 is set to the desired height as described above and the grading and leveling task is performed in the well-known manner common to graders or levellers.

Figure 2:
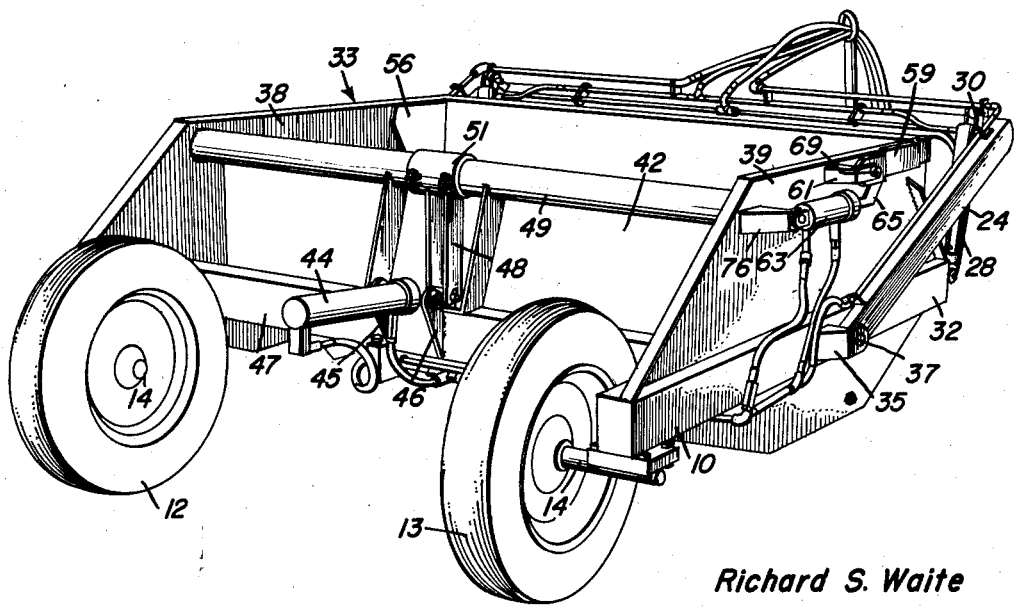
FIGURE 2 is a rear perspective view of the scraper illustrating the orientation of the components thereof.
Figure 3:
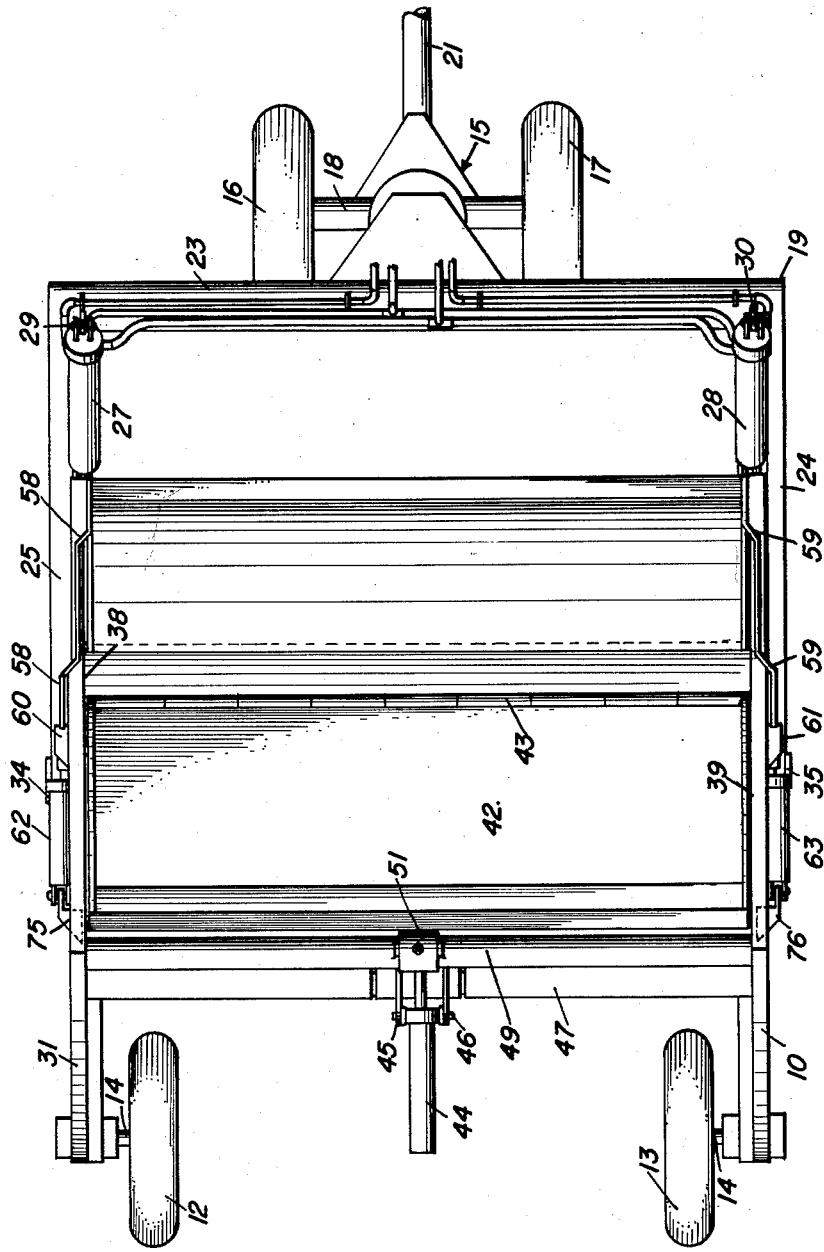
FIGURE 3 is a top plan view of the scraper.
Figure 4:
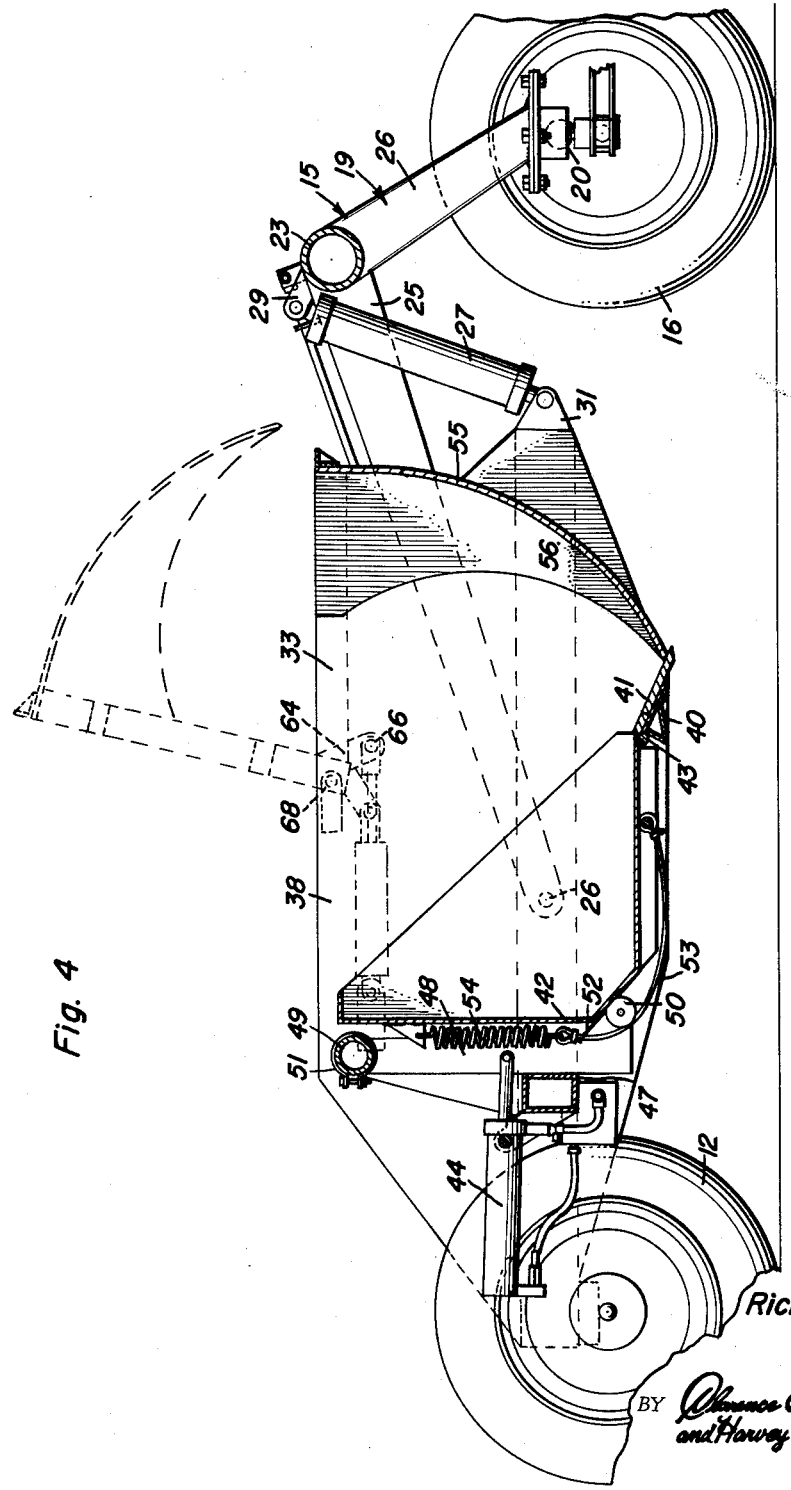
FIGURE 4 is a longitudinal, vertical sectional view of the scraper illustrating the relationship of the components thereof.

The form of the invention illustrated in FIGURES 7 and 8 is substantially the same as that employed in the structure of FIGURES 1–6 except that frame members 82 and 83 are rigidly interconnected at their forward ends by cross frame member 84. Forwardly extending frame elements 85 converge and connect rigidly with a tongue 86 which extends rearwardly and is connected to the cross member 84. The forward end of the tongue 86 is provided with a clevis 87 and a clevis pin 88 which connects the tongue 85 to a drawbar 89 which is elevatable by virtue of being supported by forwardly extending arms 90 and connected to lift links 91 having their upper ends carried by lift arms 92. The lift arms 92 are controlled from the tractor whereby the vertical orientation of the drawbar 89 is adjustably orientated thus raising and lowering the front end of the bucket assembly generally designated by the numeral 80.

The structure of the bucket assembly including the openable gate, the ejection bucket and scraper blade all are the same as illustrated in FIGURES 1–6 and common reference numerals are provided therefor. The operation of the device in FIGURES 6 and 7 is substantially the same as that in FIGURES 1–6 except that the dolly construction and the lift cylinders 27 and 28 have been omitted. The hydraulic circuit that includes the ejector and gate operating mechanism remains the same and the two hydraulic lines on the scraper are connected to a valve such as the valve 70 that is mounted on the tractor and the movement of the blade relative to the ground is controlled by a valve which raises or lowers the drawbar 89. This hydraulically operated drawbar is a conventional item on various types of commercially available tractors.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A scraper comprising a wheel supported frame, a bucket mounted on said frame and including spaced, opposed side walls, a blade extending between the lower portions of the side walls, a vertically swingable gate for closing the bucket forwardly of the blade, means for actuating the gate, a vertically swingable ejector hingedly mounted between the side walls at the rear of the blade and forming the rear of the bucket, a cylindrical cross member extending between the upper portions of the side walls rearwardly of the ejector, a bar journaled on the ejector for forward and rearward swinging movement and depending from said cross member immediately adjacent the rear of the ejector and having its free end portion slidably engaged beneath the bottom portion thereof for actuating same to ejecting position and, further, for supporting said ejector in retracted position, a two-way hydraulic ram operatively connected to the bar, a cross member extending between the lower portions of the side walls in the path of the bar for limiting rearward swinging movement thereof and positively retaining same in ejector-supporting position, a roller on said free end portion of said bar operable on the ejector, and means operatively connecting the bar to the ejector for retracting same, the last-named means including a cable operable on the roller and connected at both ends to the ejector, said last-named means further including a spring interposed between one end of the cable and the ejector.

2. A scraper comprising a wheel supported frame, a bucket mounted on said frame and including spaced, opposed side walls, a blade extending between the lower portions of the side walls, a vertically swingable gate for closing the bucket forwardly of the blade, means for actuating the gate, a vertically swingable ejector hingedly mounted between the side walls at the rear of the blade and forming the rear of the bucket, a cylindrical cross member extending between the upper portions of the side walls rearwardly of the ejector, a bar journaled on the ejector for forward and rearward swinging movement and depending from said cross member immediately adjacent the rear of the ejector and having its free end portion slidably engaged beneath the bottom portion thereof for actuating same to ejecting position and, further, for supporting said ejector in retracted position, a two-way hydraulic ram operatively connected to the bar, a cross member extending between the lower portions of the side walls in the path of the bar for limiting rearward swinging movement thereof and positively retaining same in ejector-supporting position, a roller on said free end portion of said bar operable on the ejector, and means operatively connecting the bar to the ejector for retracting same, the last-named means including resilient means operably connected with the roller and comprising end portions connected to the ejector.

3. The combination of claim 1, said roller being operable between the cable and the ejector.

4. The combination of claim 1, said spring including a coil having one end connected to said one end of the cable and its other end anchored to the ejector.

References Cited in the file of this patent
UNITED STATES PATENTS

| | | |
|---|---|---|
| 2,271,790 | Allin | Feb. 3, 1942 |
| 2,278,829 | Clark | Apr. 7, 1942 |
| 2,332,686 | Austin et al. | Oct. 26, 1943 |
| 2,406,826 | French et al. | Sept. 3, 1946 |
| 2,609,622 | Murray | Sept. 9, 1952 |
| 2,650,440 | Quartullo | Sept. 1, 1953 |
| 2,965,988 | Monk | Dec. 27, 1960 |
| 2,984,026 | Thompson et al. | May 16, 1961 |